C. P. THOMAS.
SAFETY TRAIN CONTROL SYSTEM.
APPLICATION FILED JULY 13, 1917.

1,260,250.

Patented Mar. 19, 1918.
4 SHEETS—SHEET 1.

Inventor
Charles P. Thomas
T. R. Bryant,
Attorney

UNITED STATES PATENT OFFICE.

CHARLES PARNELL THOMAS, OF SAN FRANCISCO, CALIFORNIA, ASSIGNOR OF ONE-HALF TO ISAAC FECHHEIMER, OF SAN FRANCISCO, CALIFORNIA.

SAFETY TRAIN-CONTROL SYSTEM.

1,260,250. Specification of Letters Patent. Patented Mar. 19, 1918.

Application filed July 13, 1917. Serial No. 180,417.

*To all whom it may concern:*

Be it known that I, CHARLES PARNELL THOMAS, a citizen of the United States, residing at San Francisco, in the county of San Francisco and State of California, have invented certain new and useful Improvements in Safety Train-Control Systems, of which the following is a specification.

This invention relates to certain new and useful improvements in safety train control systems.

The primary object of the invention is the provision of a safety system for controlling trains whereby trains approaching a closed block of track are automatically brought to a stop before entering such block.

A further object of the invention is the provision of a controlling system for trains operable in connection with any of the block signal systems now in use and adapted for preventing end-on collisions by preventing more than one train from entering a single block of track at one time.

A still further object of my system is to provide a safety equipment that may be readily installed upon a train and operably associated with the block signal system of the road-way in such a manner as to be automatically controlled simultaneously with the actuation of the semaphore arm thereof without interfering with or in any manner influencing the regular operation of the block signal system.

It is also designed by means of my system to safe-guard against railroad accidents caused by the neglect of engineers, either intentionally or otherwise, to comply with the warnings of the block signal systems of the line, the arrangement being such that the engineer of the locomotive will be powerless to prevent the stopping of his train when approaching a closed block of track, without the fact being readily detected by the train inspector or electrical engineer in charge of the electrical safety appliance upon inspection at any time, such as at the termination of the trip.

By means of my system of safety appliances the air-brakes of a train will be automatically set when the engine approaches within a suitable distance, such as five hundred feet, of a semaphore signal set at "danger" at the entrance of a closed block, it then being impossible for the engineer to release the brakes for starting the train without first re-setting the safety mechanism, the re-setting device being preferably positioned in locked arrangement exteriorly of the locomotive cab, whereby the engineer will be required to descend from the cab before re-setting the same. A recording mechanism is associated with my safety system whereby the exact time of the automatic setting of the brakes as well as that of the re-setting of the mechanism is visibly recorded which is inaccessible to the engineer but may be inspected by the authorized official of the railroad. I also provide an indicating lamp of suitable color within the locomotive cab normally lighted when the safety mechanism is set for operation while a differently colored lamp and an alarm bell are automatically electrically operated upon the setting of the brakes and until the safety appliance is again re-set manually.

With these general objects in view and others that will appear as the nature of the invention is better understood, the same consists in the novel construction, combination and arrangement of parts hereinafter fully described, illustrated in the accompanying drawings and pointed out in the appended claims.

In the drawings forming a part of this application and in which like designating numerals refer to corresponding parts throughout the several views:—

Fig. 11 is an elevational view partly in vertical section illustrating the rail contacting members adapted to be carried by the train and shown in their normal lowered positions.

Fig. 12 is a view of the same in their operative elevated positions contacting the trip rails, the latter being shown arranged outwardly of the railway rail of the roadway, and, Fig. 13 is a vertical sectional view thereof with parts broken away.

Figure 6:
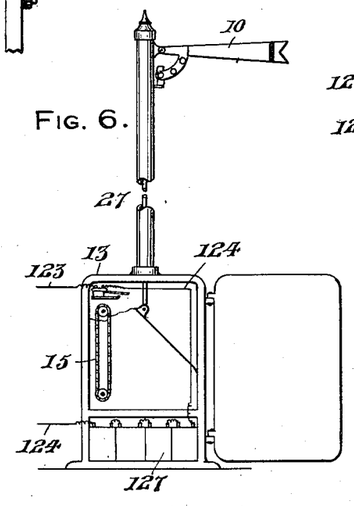
Fig. 6 is an elevational view of a semaphore block signal member, partially broken away, and illustrating my system of wiring and battery arrangement associated therewith for automatic control.

It will be first understood that I broadly contemplate the prevention of end-on, such as rear-end collisions, by automatically setting the air-brakes of a train when approaching within a predetermined distance of a block signal arranged adjacent the track which has its semaphore arm such as that illustrated at 10 in Fig. 6 of the drawings, arranged in its danger position. Such position of the semaphore arm may vary in different block signal systems for indicating "danger" but in each of such systems a mechanism is employed which is similar to that illustrated in Figs. 6 and 7 of the drawings. In other words, spring contacts such as 11 and 12 are ordinarily arranged within the mechanism box 13 so associated with the elevating member 14 of the arm 10 which is controlled by the endless sprocket chain 15 as to bring the post 16 of such mechanism against the contact spring 11, thereby breaking the circuit between the contacts 11 and 12 when the members 14 and 10 are properly arranged whenever the signal is set at "danger", it being understood that the spring-mounted bracket 17 supporting the post 16 is engaged as at 18 by a portion of the elevating member 14.

The main operating mechanism for the device is arranged within a box 19 carried at any convenient point upon the locomotive 20 such as exteriorly of the engineer's cab 21, contact members 22 being preferably arranged upon one of the trucks 23 of the tender 24 for engaging the trip rails illustrated in Fig. 10 when the tender passes thereover, the hereinafter described mechanism being adapted to actuate the brake valve 25 of the air line of the train positioned within the box 19 whenever the arm 10 of the adjacent block signal is set at "danger" as hereinbefore noted.

Figure 10:
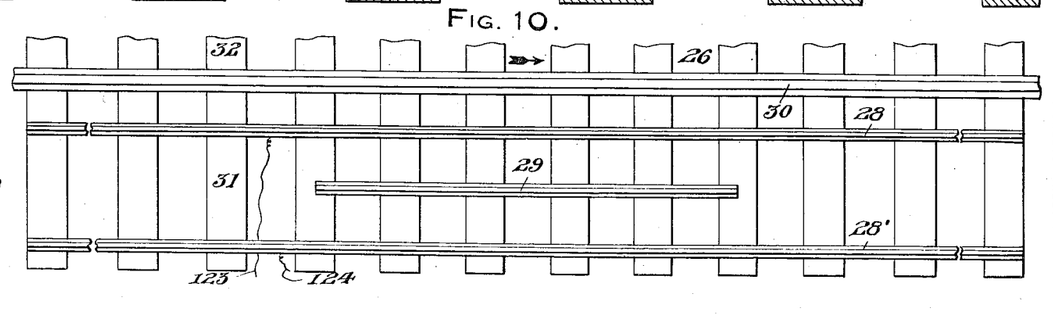
Fig. 10 is a top plan view of the right-hand portion of a railroad track provided with trip rails.
Figures 11, 12, 13:
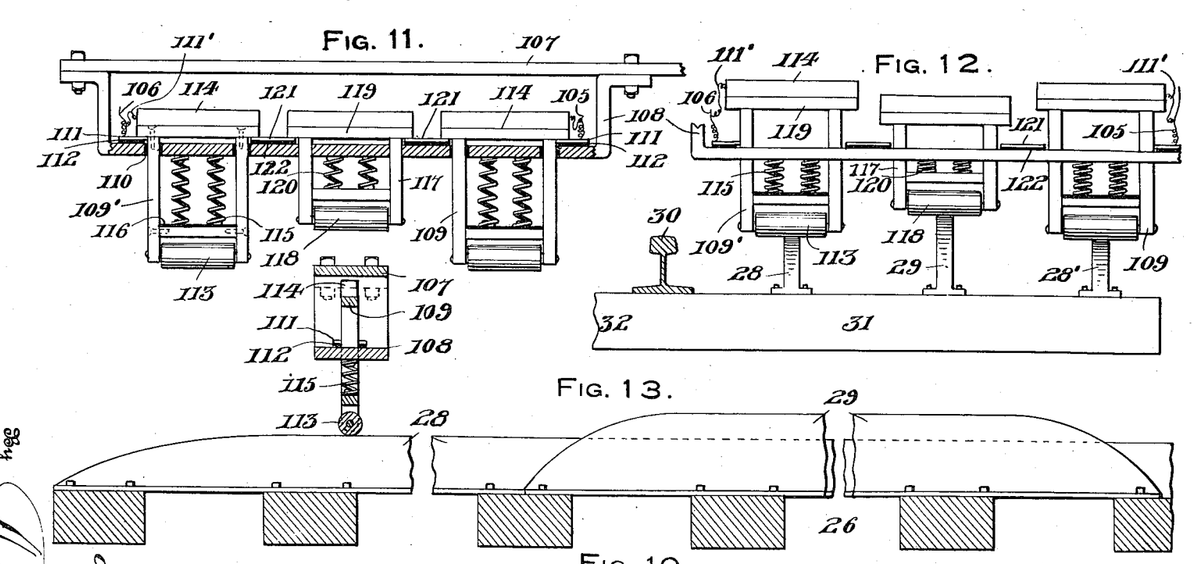

The railway track 26 upon which the locomotive 20 and tender 24 are running toward the block signal 27 shown in Fig. 6, is provided with three longitudinally arranged trip rails as best illustrated in Figs. 10 and 12 of the drawings, the outer trip rails 28 and 28' being termed terminal rails and an intermediate relatively shorter and higher trip rail 29 positioned therebetween being termed the switch rail. It will be understood that the said three trip rails are preferably arranged outwardly of the right-hand rail 30 of the track 26 upon outward extensions 31 of the ties 32 of the track although the trip rails may be positioned between the track rails if service conditions so warrant and in which event, the contact mechanism 22 carried by the train will be positioned accordingly. It is also obvious that one or more of the trip rails may be positioned between the track rails while the remainder thereof may be arranged outwardly of the track rails, while upon a single track line such a system of trip rails may be duplicated at opposite sides of the track and my entire system adapted for actuation during the passing of trains in either direction over the railroad.

Figure 2:
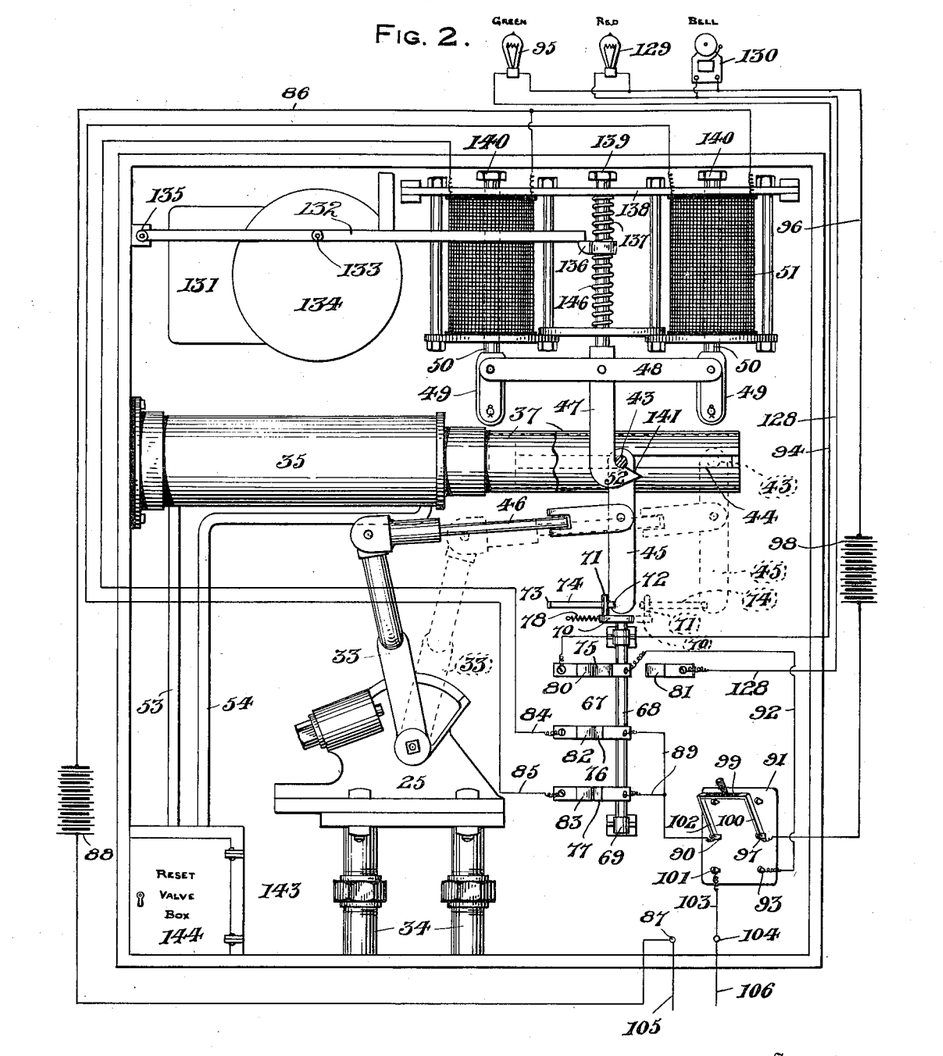
Fig. 2 is a view of the main mechanism, adapted for mounting upon a locomotive, illustrating the electrical wiring partly diagrammatically and with portions broken away.

The brake valve 25 being arranged within the casing 19, the same may be of any known type having a throttle lever 33 and with piping 34 connected with the air brake line of the locomotive, the throttle being normally arranged in running position as shown in full lines in Fig. 2 of the drawings but in the emergency position indicated by dotted lines therein when automatically actuated by the herein described mechanism and at which times the air-brakes of the train will be set, stopping the train. A controlling cylinder 35 is mounted within the casing 19 being preferably substantially elliptical in cross-section and provided with a reciprocating piston 36. Parallel guide tubes 37 are carried by the inner head 38 of the cylinder 35 provided with cylindrical blocks 39 connected with the piston 36 by means of rods 40 slidably arranged through stuffing boxes 41 within the inner closed ends 42 of the tubes 37.

A bar 43 connects the blocks 39 slidably extending through slots 44 in the inner adjacent sides of the tubes 37. An arm 45 is rigidly secured centrally of the bar 43 between the tube 37 and is connected to the throttle lever 33 by means of a double link 46. It will be noted that when the piston 36 is in its set arrangement as illustrated in Figs. 2 and 4 of the drawings, the throttle 33 will be in its normal position with the air-brake released but when the said piston has been shifted forwardly as indicated by dotted lines in Fig. 3, the throttle valve 33 will be in its emergency position with the arm 45 and link 46 forwardly arranged as shown by dotted lines in Fig. 2.

A retaining hook or detent 47 is provided for normally engaging the bar 43 when the piston 36 is set the said hook being operatively connected by means of plates 48 with the depending heads 49 of the cores 50 of solenoids 51 arranged within the casing 19 above the plane of the tubes 37. When the solenoids 51 are energized in the normal condition of the mechanism, the cores 50 are positioned inwardly thereof and are elevated, bringing the engaging lower upturned end 52 of the hook 47 into engagement with the bar 43, thereby maintaining the piston 36 in its set arrangement. With suitable air pressure in the cylinder 35 rearwardly of the piston 36, it will be understood that upon the de-energizing of the solenoids 51, the cores 50 will be released, descending of their own weight, thereby releasing by only a slight downward movement of the hook ends 52 beneath the bar 43 and permitting the air pressure to forwardly move the piston 36, bringing the throttle lever 33 into the emergency position.

Air pipes 53 and 54 are tapped into the cylinder 35 adjacent the rearward and forward ends thereof respectively, and at opposite sides of the extremes of movement of the piston 36 and having an air controlling valve 55 operatively connecting the said pipes. A turn plug 56 is arranged for the valve 55 having a shifting lever 57 while an air inlet pipe 58 is connected with the valve 55 for supplying air from an air reservoir not shown, such as the auxiliary air reservoir of the air-brake system of the train line. The plug 56 has an arcuate cut-away side portion 59 for receiving air at all times from the inlet pipe 58, the turning of the plug 56 by means of the lever or handle 57 thereof effecting a communication for the air between the cut-away portion 59 and either of the pipes 53 or 54 as the occasion requires. Stop pins 60 extend within the cut-away portion 59 for engaging shoulders 61 at the opposite ends of the cut-away portion 59 when the plug 56 is at either extreme of its rotative movement or in other words, when the valve is positioned operatively connecting the air with either of the pipes 53 and 54.

Figures 3, 4, 5:
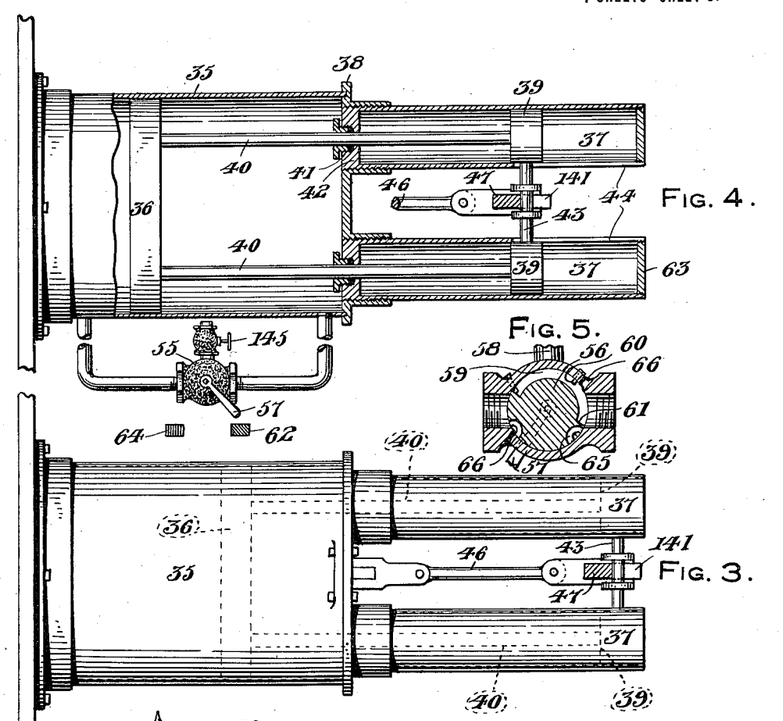
Fig. 3 is a top plan view of the trip cylinder construction with the releasable retainer shown in transverse horizontal section.
Fig. 4 is a similar view partially illustrated in central horizontal section with the members in their normal set positions and showing the re-setting air-controlling means.
Fig. 5 is a central vertical sectional view through the air-controlling valve illustrated in Fig. 4.

When the piston 36 is arranged as shown in Fig. 4 with the mechanism in its normal set position, the said piston being rearwardly positioned, the handle 57 of the valve 55 will be arranged pointing toward a green spot or indication 62 arranged adjacent the valve while the cut-away side 59 will be in communication between the air inlet 58 and the pipe 53 and whereby the pressure of compressed air from the auxiliary reservoir will be behind the piston 36. Upon releasing the bar 43, the air pressure will forwardly move the piston 36, the air which is within the cylinder 35 forwardly of the piston acting as a dash-pot for cushioning the movement of the piston which will also be assisted by the air between the blocks 39 and the forward closed ends 63 of the tube 37. The piston 36 is adapted to be returned rearwardly by shifting the handle 57 to the position indicated in Fig. 5 of the drawings and pointing in the direction of the red spot or indication 64. When in this arrangement, the air will enter through the pipe 58 passing to the pipe 54 forwardly of the piston 36 and moving the latter rearwardly to its set position for retaining engagement by the detent hook 47 in the manner hereinafter set forth. When so positioned, the handle 57 will be again shifted toward the green spot 62 for re-charging the cylinder 35 rearwardly of the piston 36. Drip ports 65 are arranged in the valve plug 56 adapted to communicate with outlet ports 66 in the casing of the valve 55 for permitting the air to escape from whichever one of the pipes 53 or 54 which is cut off by the valve plug and whereby the portion of the chamber within the cylinder 35 which is inactive will have a suitable outlet in whichever position the piston 36 may be arranged.

A rotary controlling switch 67 is mounted within the casing 19 comprising a shaft 68 journaled within brackets 69 and having a crank 70 at its upper end preferably in the form of a disk and provided with an upwardly projecting pin 71 arranged within the path of movement of the opposite ends 72 and 73 of a U-shaped pusher 74 carried by the lower end of the shifting arm 45. The arrangement of the pusher 74 is such that when the arm 45 is in its normal position with the mechanism operatively set, the ends 72 thereof will be in restrained contact with the pin 71 and with the contact arms 75, 76 and 77 carried by the shaft 68 at one extremity of their throw or movement. The tripping of the bar 43 as released by the hook 47 and its movement toward the dotted line position shown in Fig. 2 permits the spring 78 attached to the lower end of the crank 70 as at 79 to turn the shaft 68 for placing the switch arms or blades 75, 76 and 77 at the opposite extremities of their strokes. In the event of the inaction or elimination of the spring 78, the ends 73 of the pusher 74 will in its contact with the pin 71 throw the switch shaft 68 in the same manner as if operated by the spring 78. The rearward or charging movement of the piston 36 when the same is being re-set brings the pusher end 72 against the crank pin 71 turning the shaft 68 to its normal set position and retaining the same so set until again released by the forward movement of the pusher 74 and the arms 45 when the mechanism is tripped. In this manner, the pusher 74 forcibly operates upon the crank 70 to throw the switch 67 in one direction or the other at each longitudinal actuation of the pusher 74.

The switch blade 75 is double while the blades 76 and 77 are single, that is, the blade 75 is arranged with a spring contact post 80 at one side thereof and an oppositely positioned similar contact post 81 at the opposite side thereof while similar contact posts 82 and 83 are provided for the blades 76 and 77 respectively at the same side of the shaft 68 as the post 80 is positioned. Circuit wires 84 and 85 lead from the posts 82 and 83 respectively to the separate solenoids 51 while a single return wire 86 connects the solenoids 51 with a binding post 87 within the casing 19, a suitable battery 88 being arranged in the circuit of the return wire 86 adapted for energizing the solenoids 51 when the circuit is closed. Wires 89 connect the blades 76 and 77 of the switch 67 with the post 90 of a double knife switch 91 arranged within the casing 19, it being evident that when the switch 67 is arranged as illustrated in Fig. 2 of the drawings with the mechanism in its normal set arrangement, the blades 76 and 77 will be in contact with the posts 82 and 83 respectively, so that any bridging or connecting of the switch post 90 and the binding post 87 will close the circuit of the solenoids 51 and the battery 88 maintaining the hook 47 in its operative retaining position.

When the switch 67 is positioned in its solenoid circuit closing position just described, the blade 75 will be in contact with the post 80. The blade 75 is connected by means of a wire 92 with the split or socket post 93 of the switch 91, while the contact post 80 is connected by means of a wire 94 with a green signal lamp 95, a return wire 96 being provided for the said lamp connected with the hinge post 97 of the switch 91, opposite the aforementioned hinge post 90. A battery 98 is arranged within the circuit wire 96 and it will be evident that when the knife switch blade member 99 is closed bridging the posts 93 and 97, the circuit will be completed from the post 97 through the wire 96 and battery 98 to the lamp 95 and then through the wire 94 to the post 80, through the blade 75 to the wire 92 and thence to the post 93 which is electrically connected to the post 97 by the side 100 of the knife switch member 99. It will be understood that the switch 91 is closed at all times when the safety device is in operation, so that the green lamp 95 is normally lighted at all times when the mechanism is set and the switch 67 is in its position as noted.

A split post 101 is provided for the switch 91 opposite the post 93 while the side 102 of the switch member 99 is adapted for closing the circuit between the posts 90 and 101 when the switch 91 is normally closed. A wire 103 connects the post 101 with a binding post 104 adjacent the binding post 87 of the wire 86, outside leads 105 and 106 being connected to the posts 87 and 104 respectively. From the foregoing description, it will be evident that when the mechanism is in its normal set arrangement and with the circuit breakers hereinafter described as being arranged normally closed between the wires 105 and 106, the solenoids 51 will be energized by the battery 88 carried at any convenient point upon the locomotive 20 while the green lamp 95 will at such times be lighted, the said lamp being positioned at a plainly viewable point within the engineer's cab 21.

Figure 1:
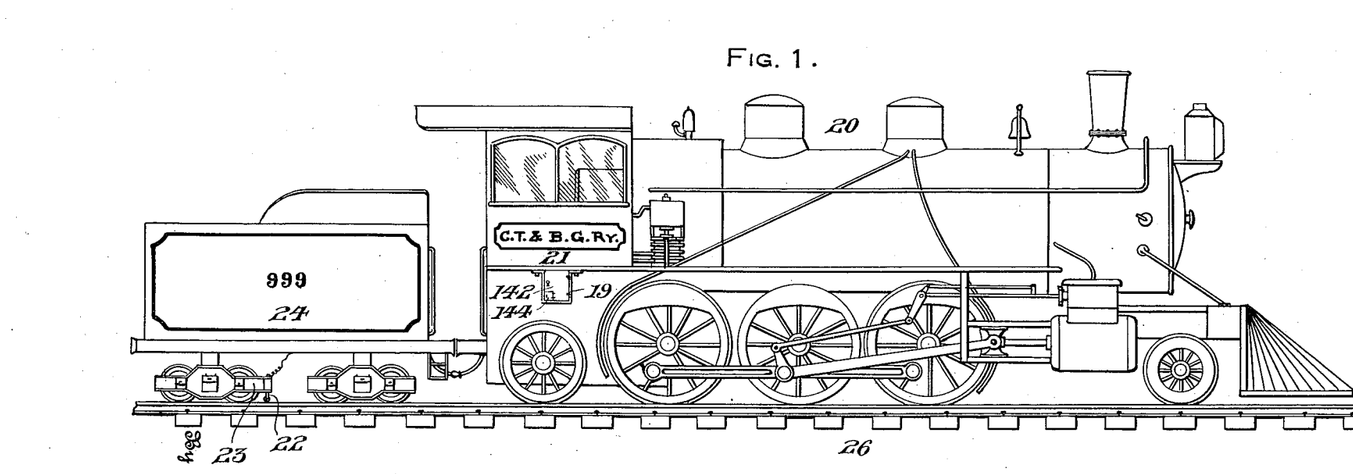
Figure 1 is a side elevational view of a locomotive and tender provided with my safety system for controlling the air brakes thereof.

The trip control mechanism 22 illustrated in Fig. 1 of the drawings mounted upon the tender truck comprises a plate 107 secured at a convenient point upon the truck and projecting outwardly thereof for arranging a depending bracket 108 carried thereby positioned in a plane at the side of the track rail 30 and positioned above the trip rails 28, 28' and 29 when the locomotive and tender pass along the track adjacent the trip rails spaced circuit breakers or controlling trip shoe members 109 and 109' in the form of rectangular frames are slidably arranged upright through the bracket 108 being insulated from the bracket by bushings 110. Terminal plates 111 insulated from the bracket 108 by insulation 112 are carried by the bracket 108 and have the wires 105 and 106 attached thereto, while the plates 111 have constant electrical wiping contact with the adjacent sides of the said trip members, it being seen that the terminal plate 111 of the trip shoe 109 is electrically connected with the wire 105 while the trip shoe 109' is electrically connected with the wire 106. Connecting wires 111' may also be used.

The said trip shoes are arranged at the lower ends with suitable engaging members 113 for riding upwardly upon the trip rails 28 and 28' whenever the locomotive passes by the trip rails and whereby as will be evident, the contact shoes 109 and 109' will be elevated as illustrated in Fig. 12 of the drawings. A weighted head 114 is provided at the upper end of each of the trip shoes, which together with the weight of the shoes normally maintains the shoes lowered in a position to engage the trip rails 28, 28'. Springs 115 may also be employed however for returning the shoes 109, 109' to their lowered positions, which also serve to cushion the upward movement of the shoes, the said springs 115 being insulated from the shoes by suitable insulation 116.

A similar trip shoe 117 is carried by the bracket 108 between the members 109 and 109' having an engaging member 118 at its lower end adapted for riding upon the central trip rail 29 the same having a weighted head 119 as well as return springs 120, similar to the arrangement described in connection with the other trip shoes. The shoes 109 and 109' are normally electrically connected when the shoes are out of contact with the trip rails, this being accomplished by the normal positions assumed by the heads 114 and 119 resting upon intervening contact plates 121 carried by the bracket 108 and insulated therefrom by insulation 122.

By this arrangement it will be evident that the electrical connection between the wires 105 and 106 will be normally closed, the trip shoes being arranged lowered as shown in Fig. 11 of the drawings, while upon forcing the trip shoes upwardly when riding over their respective trip rails, the circuit breaker 119 will open the circuit between the shoes 109 and 109' which will cause the solenoids 51 to deënergize and tripping the mechanism within the casing 19 for setting the brakes upon the train by means of the throttle lever 33.

Notwithstanding this automatic opening of the circuit breaker 117 when riding upon the trip rail 29, any other manner of closing the electrical circuit between the trip shoes 109 and 109' will maintain the circuit from the battery 88 in the solenoids 51, preventing the releasing of the brake setting mechanism. Such a connection is provided automatically opened and closed by the block signal 27, such connections being in the form of wires 123 and 124 connected to the trip rails 28 and 28' respectively and being attached in circuit with the spring contacts 11 and 12 or circuit breaker within the block signal box 13. The wire 123 is connected with the binding post 125 of the spring 11 while the wire 124 is attached to the binding post 126 of the spring 12.

Figure 7:
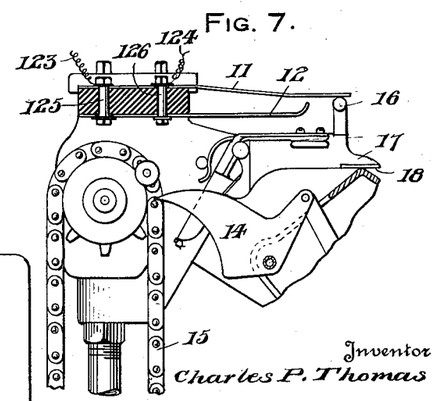
Fig. 7 is an enlarged elevational view of a portion of the mechanism of a block signal system to which my wiring may be electrically connected.
Figure 8:
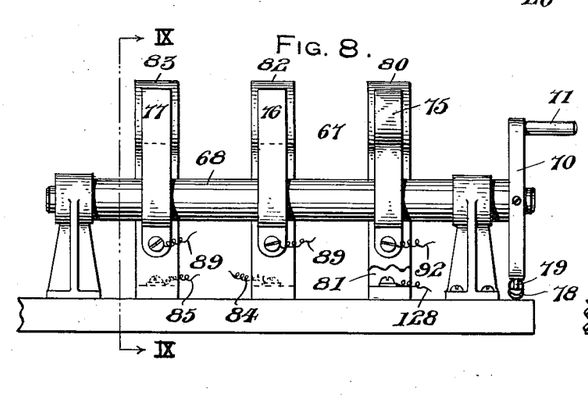
Fig. 8 is an elevational view of the rotary controlling switch forming a part of the mechanism of my system.
Figure 9:
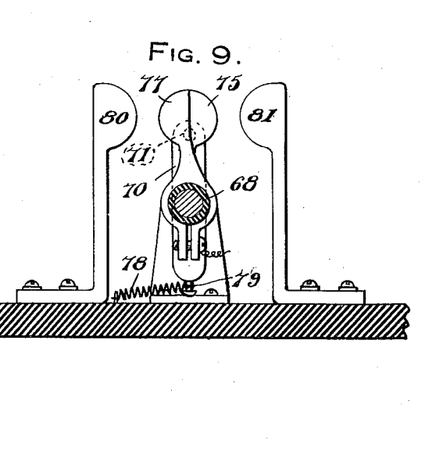
Fig. 9 is a transverse sectional view taken upon line IX—IX of Fig. 8 looking in the direction of the arrows.

When the semaphore arm 10 is in its "clear" position, the springs 11 and 12 will be in contact whereby the trip rails 28 and 28' will be electrically connected together by the wires 123 and 124 and the circuit breaker of the block signal system so that upon contacting the trip shoes 109 and 109' with the trip rails 28 and 28' respectively, a closed circuit will be maintained between the wires 106 and 105 although the circuit breaker 117 upon the train is opened. In this manner, the passing of the locomotive past the trip rails and contacting the three trip shoes with their respective trip rails will not break the circuit for the solenoids 51 but will maintain such circuit unbroken as there is a closed circuit through the block signal mechanism 27 when the semaphore arm 10 is at "clear". It will be evident however that as the springs 10 and 11 are separated when the arm 10 is at "danger" position as illustrated in Figs. 6 and 7 of the drawings, there will at such times be a break in the circuit between the wires 123 and 124 when the trip shoes are arranged upon the trip rails so that the solenoids 51 will be cut off from the source of electrical supply and will become deënergized permitting the hook 47 to release the piston 36, whereby the throttle lever 33 will be thrown to the emergency position, operating the air-brake valve 25 and setting the brakes upon the train.

Auxiliary batteries 127 may be arranged within the box 13 if desired, positioned within the circuit wire 124 and which batteries 127 assist the train batteries 88 in maintaining the solenoids energized when the circuit breaker of the block signal system is closed during the actuation of the trip shoes carried by the train. In this connection it may be noted that the trip rails 28 and 28' forming terminals for the batteries 127 may be insulated from the ties 32 if desired while one of the same may be omitted by employing the locomotive for a grounding of the circuit and providing a return circuit in this manner. The engaging members 113 and 118 of the trip shoes are here illustrated in the form of rollers for readily riding upon the trip rails but it will be understood that any form of similar members may be used if desired, such as brushes or flat shoes having a wiping contact with the trip rails, it being only essential that the outer contact members 109 and 109' will serve to electrically connect the binding posts 87 and 104 respectively with the trip rails 28 and 28' respectively which are attached to the springs 11 and 12.

When the mechanism within the casing 19 is tripped, and the air-brakes are set, the blade 75 of the switch 67 will be in contact with the post 81. This will close the electrical circuit between the wire 92 leading to the switch 91 with a wire 128 attached to the post 81 and connected to the wire 96 of the battery 98 and having a red lamp 129 and an alarm bell 130 in the circuit of the said wires 128 and 96, it being understood that the wires 92 and 96 are normally connected by the side 100 of the switch member 99 which is normally closed. By this arrangement it is seen that whenever the train approaches the block signal such as 27, with the latter set at "danger", the air-brakes will be set and the red lamp 129 will be lighted while the green lamp 95 will be extinguished and the bell 130 will begin to ring and will continue sounding an alarm until the rotary switch 67 is reversed by the operation of the mechanism associated with the piston 36, the latter being controlled by the valve handle 57. The lamp 129 and the bell 130 are preferably located adjacent the green lamp 95 in the engineer's cab 21.

A suitable time recorder 131 is arranged within the casing 19 provided with an operating lever 132 having a recording pencil 133 for marking indications upon the revolving dial 134 of the recorder 131. The lever 132 is suitably pivoted at one end as at 135 while its opposite end rests upon a lug 136 of an upward extension 137 of the hook 47, the said extension being slidably positioned through the frame plate 138 of the solenoid 51 and arranged with an adjustable nut 139 upon its upper end for limiting the downward movement of the hook 47 and its extension. It will be understood that when the hook 47 drops, the pencil 133 will move toward the center of the dial 134, marking in a different circular path but returning to its original path of uniform diameter when the hook 47 again rises upon resetting the mechanism. It will be understood that the dial 134 is turned by clock mechanism in the well-known manner so that the exact time of the automatic actuation of the brake lever 33 may be subsequently determined upon inspection of the dial as well as a record of the length of time that the brakes remained set and the time at which they were released upon resetting the safety mechanism.

The core 50 of the solenoids 51 are provided with adjusting nuts 140 upon their upper ends for limiting the downward movements of the cores 50 it being noted that only a limited downward movement thereof is necessary which is sufficient to release the hook 52 from the bar 43. The hook end 52 has an inclined terminal face 141 over which the bar 43 will move for seating within the hook during the forcible returning of the bar 43 to its set position by means of the piston 36.

A lid or door 142 is arranged for the casing 19, the key of which is to be only in the possession of the proper inspecting officer of the railroad while the resetting valve 55 is arranged within a corner compartment 143 of the casing 19 and into which the pipes 53 and 54 are led, a door 144 being provided for the said compartment, the key of which is in the possession of the engineer in charge of the locomotive 20.

The safety mechanism upon the locomotive 20 is normally in its set arrangement with the brakes released, the switch 91 being closed as well as the circuit breaker 117 of the train carried trip 22, the green lamp 95 being lighted. Upon approaching the block signal 27 when set at "safety" with the springs 11 and 12 in contact with each other, the running of the roller 118 of the circuit breaker 117 upon the trip rail 129 will open the circuit between the wires 105 and 106 but the contacting of the rollers 113 of the contact shoes 109 and 109' with the terminal trip rails 28 and 28' will maintain the electric circuit closed through the solenoids 51 and which circuit will be augmented by the battery 127 within the signal box 13 so that the mechanism within the casing 19 would not be affected and the train will pass by the trip rails and into the open or clear block of track. If the block signal 27 is set at "danger" the springs 11 and 12 will be separated so that upon opening the circuit breaker 117, the circuit between the battery 88 and the solenoids 51 will be broken as well as the track circuit through the batteries 127, so that the solenoids will be deënergized, permitting the hook 47 to drop, thereby releasing the bar 43 and allowing the air under pressure rearwardly of the piston 36 to move the piston forwardly throwing the throttle valve 33 and setting the brake. This action as heretofore noted lights the red lamp 129 and starts the bell 130 sounding an alarm. The cushioned forward movement of the piston 36 makes the movement of the throttle valve uniform and moderate, thereby bringing the train gradually to a stop and the trip rails being positioned, say 500 feet from the danger signal 27, the train will be stopped before the locomotive enters the closed block. The trip rails 28 and 28' being of short length such as about 30 feet and the circuit breaker operating trip rail 29 being much shorter and about 5 feet long, the trip shoes will all pass entirely over and forwardly of the trip rails by the time the train locomotive has been brought to a complete stop. At such time, the engineer may descend from his cab 21 and open the door 144 of the reset valve box or compartment 143 and move the valve handle 57 positioned therein first toward the red spot 64 for retracting the piston 36 and simultaneously throwing the switch 67 energizing the solenoids 51 and resetting the entire mechanism, while thereafter the handle 57 will be turned toward the green spot 62 for bringing the air pressure of the pipe line rearwardly of the piston 36 and at which times the brakes are released and the train may proceed until again approaching in dangerous proximity to a closed block, that is within 500 feet thereof as now arranged whereupon the train will be stopped by the same operation as before.

At the end of the run or whenever desired, the electrician or inspecting officer of the railroad may open the door 142 of the mechanism casing 19 for inspecting the dial 134 and renewing the same, it being understood that the engineer never has access thereto but only to the resetting valve 55 within the compartment 143. The embodiment of my invention herein set forth, it will be understood is only for the purpose of illustrating the broad principle involved of automatically controlling the air-brakes of a train through the block signal system of a railway line without drawing from the source of electrical energy of the block system or interfering in any degree whatsoever therewith. The further principle of operation of providing a controlling circuit upon the train automatically broken whenever a block signal is approached will be noted and the completion thereof by picking up an auxiliary circuit arranged within the block signal box for maintaining normal conditions in the train mechanism when the block being approached is clear while the train circuit remains broken when the block signal is set at "danger" and the train automatically brought gradually to a standstill in advance of the closed block. These principles forming the invention are applicable to all railway lines upon which any form of block signals are employed although the embodiment of the mechanism now disclosed for carrying out such principles may only be applicable to certain railroads and not to others. Changes may therefore be made in form, proportion and arrangement of parts without varying in any manner from the spirit and scope of the present invention as hereinafter claimed.

The supply of air through the inlet pipe 58 is controlled by a valve 145 arranged therein, while it will be understood that the batteries 88, 98 and 127 may be of any desired form and strength, the batteries 127 being preferably of about 28 volts. Equalizing springs 146 may be arranged upon the extension 137 at opposite sides of the lug 136 if desired for cushioning the movements of the hook 47 preventing a jerky actuation thereof, although the said springs are not considered essential to the perfect operation of the device.

It has been known that engineers often drive their trains intentionally past block signals which are set against them and voluntarily run into a closed block, while at other times an engineer may become incapacitated by reason of illness or death from properly operating his locomotive and in all of such cases my safety system insures the stopping of the train at a point near the block signal preventing any possible accident. The railroad inspector may ascertain the efficiency of the engineer in complying with the block signals of the line by a careful inspection of the recording dials with which the device is provided. No portion of the system interferes with the operation of trains when conducted according to the rules of the road, as the brakes will never be automatically set or the train stops excepting when the rules are disobeyed by attempting to enter a closed block. The auxiliary brake valve 25 of my system has no effect upon the engineer's controlling valve located within the cab 21. The device is not expensive to install and possesses great strength and durability and is devoid of parts which are liable to break or get out of repair while the construction is such as to be uninfluenced by varying weather conditions. The system is operated upon normally closed electric circuits so that any break in the circuit wires automatically trips the mechanism shifting the throttle lever and setting the brakes for stopping the train. It will be understood that the relative proportions of the different parts, such as the diameter of the air ports 65 and 66 of the valve 55 and the dimensions of the pistons 36 can only be ascertained by actual tests of the mechanism when constructed for service upon the line where the same is to be adopted. The switch 91 may be opened when desired to render the mechanism inoperative, for instance, when changing the dial 134 or when the locomotive is in the yard.

What I claim as new is:—

1. A train control system comprising a brake valve, an air cylinder elliptical in cross section tubes projecting from said cylinder, a piston within said cylinder, blocks within said tubes connected to the piston, a connecting bar between said blocks, connecting means between said bar and valve, air charging means for said cylinder and electrical retaining means for the piston associated with said bar.

2. A train control system comprising a brake valve, an air cylinder elliptical in cross section tubes projecting from said cylinder, a piston within said cylinder, blocks within said tubes connected to the piston, a connecting bar between said blocks, connecting means between said bar and valve, air charging means for said cylinder, solenoids arranged adjacent the tubes, cores for said solenoids and a hook attached to said cores adapted for engagement with the said bar when the solenoids are energized with the hook elevated.

In testimony whereof I affix my signature.

CHARLES PARNELL THOMAS.